Nov. 7, 1961 R. WUCHER 3,007,202
APPARATUS FOR INJECTION MOULDING OF PLASTIC MATERIALS
Filed Dec. 18, 1959 2 Sheets-Sheet 1

Inventor
R. Wucher
By: Glascock Downing Seebold
Attys

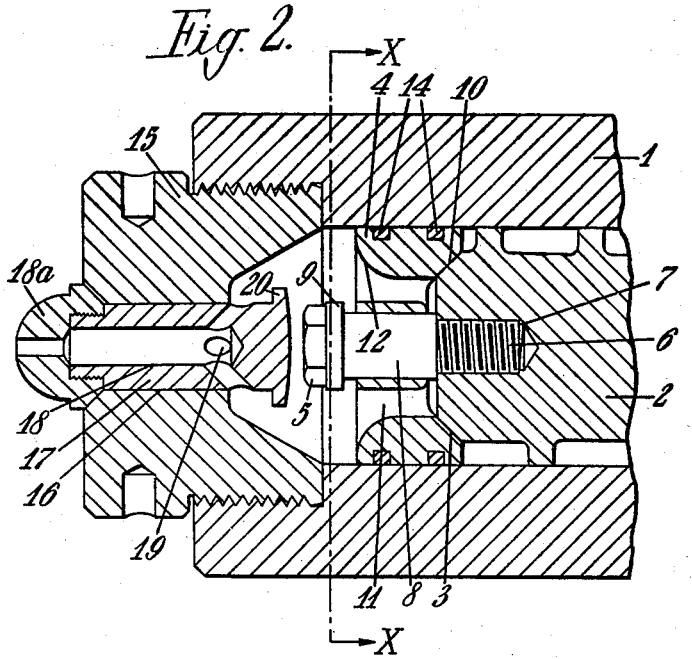
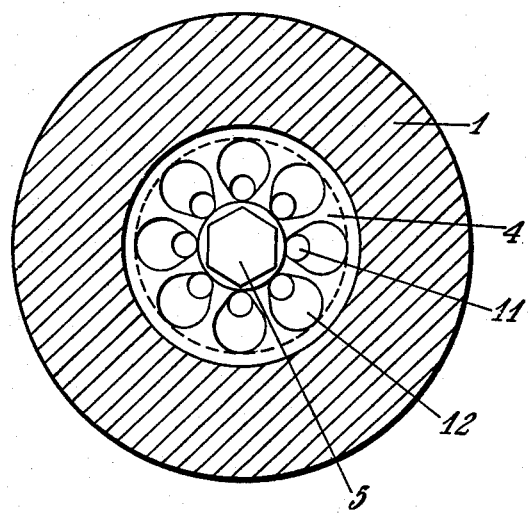

United States Patent Office 3,007,202
Patented Nov. 7, 1961

3,007,202
APPARATUS FOR INJECTION MOULDING OF PLASTIC MATERIALS
Roland Wucher, 20 Rue du Landy, St. Ouen, France
Filed Dec. 18, 1959, Ser. No. 860,562
Claims priority, application Great Britain, Dec. 22, 1958
7 Claims. (Cl. 18—30)

This invention relates to apparatus for injection moulding of synthetic resins of all descriptions and natural and synthetic rubbers or other non-metallic injection mouldable materials or compositions, especially polyvinyl chloride.

In Patent No. 2,885,734 is described an injection moulding apparatus comprising a heated cylinder, a screw or worm rotatable within the cylinder for feeding and plasticising material supplied thereto, valve means at the forward end of the cylinder, a diffuser structure or head on the screw or worm formed to provide a series of narrow passages or channels through which material is forced by the screw or worm and including means for closing said passages or channels while injection is taking place, and means for effecting relative motion between the screw or worm and the cylinder to effect injection moulding of the material by piston action of the diffuser strucrture or head. It is found in practice that there is some tendency for plastic material to accumulate or to become trapped in the non-return valves employed with this apparatus, and that the accumulated material is liable to decompose and harden so that the valve ceases to operate effectively. It is accordingly an object of the present invention to provide an improved form of non-return valve in which this disadvantage is obviated.

The invention consists in injection moulding apparatus comprising a heated cylinder, a screw or worm rotatable within the cylinder for feeding and plasticising material supplied thereto, valve means at the forward end of the cylinder, a diffuser structure or head on the screw or worm formed to provide a series of narrow passages or channels through which material is forced by the screw or worm, and means for effecting relative motion between the screw or worm and the cylinder to effect injection moulding of the material by piston action of the diffuser structure or head, in which there is associated with the diffuser structure or head a non-return valve member of piston form slidable in the cylinder and mounted for rotation and limited axial displacement on the screw or worm, and at least one spring piston ring on said valve member for engaging the cylinder bore to oppose rotation of the valve member in the bore.

The invention also consists in apparatus according to the preceding paragraphs in which the engageable seating surfaces of the non-return valve member are of conical or tapered form.

The invention also consists in apparatus according to either of the two preceding paragraphs in which the diffuser passages are formed in the non-return valve member and said passages are preferably outwardly flared at the exit ends thereof.

Other features of the invention will be understood from the following example, illustrated in the accompanying drawing, in which, FIGURE 1 is a longitudinal section of the forward end of the injection moulding apparatus constructed in accordance with one form of the apparatus, showing the nozzle valve closed and the non-return valve open;

FIGURE 2 is a similar view showing the nozzle valve open and the non-return valve closed;

FIGURE 3 is a cross-section on the line X—X of FIGURE 2.

Figure 1:
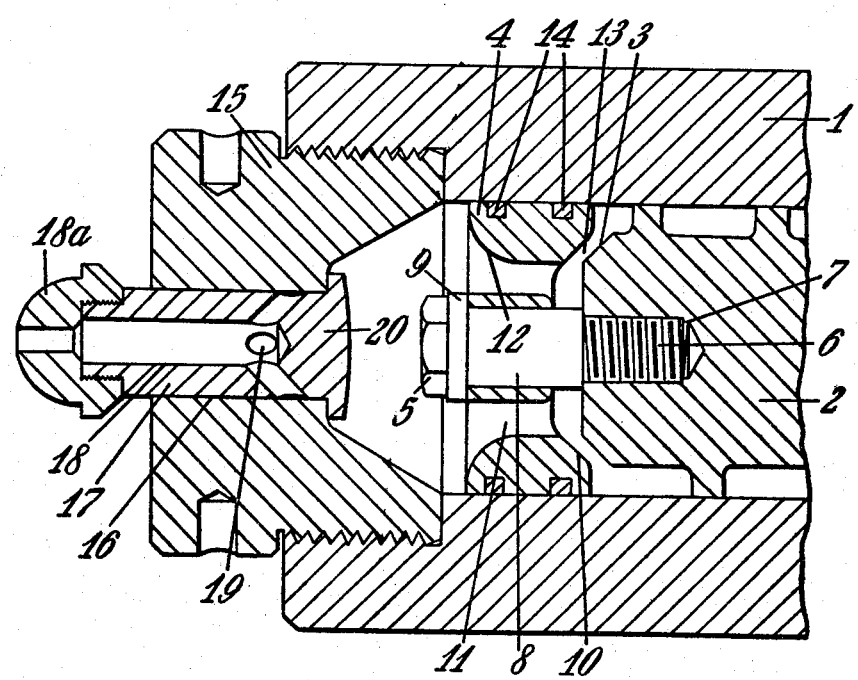

In carrying the invention into effect according to one convenient mode described by way of example and illustrated in the figures, there is provided an injection moulding machine having a cylinder 1 within which is rotatable a feeding and plasticising screw or worm 2, the general construction and operation of the machine being for example as described in the specification of Patent No. 2,885,734. The forward end of the screw 2 is formed with a conical or tapered annular surface 3, e.g. by chamfering the cylindrical end of the screw body, which constitutes one of the seating surfaces of a non-return valve. The angle of taper of said seating surface is conveniently 45°, although this is not critical. A non-return valve 4 is provided having a piston form as illustrated and is slidable within the cylinder, being mounted for rotation and limited axial displacement on the forward end of the screw 2. The piston valve 4 is mounted on a pin constituted by a bolt having a head 5 and a threaded part 6 screwed into an axial threaded bore 7 in the screw. The bolt is formed with an enlarged cylindrical portion 8 and an adjacent forward collar 9, and the piston valve 4 is rotatable and slidable on the portion 8 and between the collar 9 and the forward end of the screw 2. The inner end of the piston valve 4 is recessed and is formed with an inwardly tapering or conical surface 10 adapted to seat upon the corresponding seating surface 3 on the screw 2 when the valve is engaged therewith and thereby to close the valve. A plurality of narrow diffusing passages 11 extend through the piston valve 4 from the inner recessed end thereof within the annular seat 10 to the forward end of the valve. As shown, the inner portions of the passages 11 lie parallel to the longitudinal axis of the valve and their outer portions are flared outwardly and radially as shown at 12. The permitted axial displacement of the piston valve 4 is such that in its forward open position as shown in FIGURE 1 there is an annular space 13 of inwardly tapered form and or relatively small depth between the separated seating surfaces 3 and 10. The periphery of the piston valve which engages the bore of the cylinder, is provided with two recessed spring piston rings 14 which engage the bore under a pressure sufficient to retard rotation of the valve 4 when the screw 2 is rotating. It will be understood that a single piston ring or more than two such rings may be provided if desired. A head 15 is secured within the forward end of the cylinder 1 and has a bore 16 in which is slidable a central nozzle valve 17 having a central bore 18 and a nozzle head 18a adapted to have sealed engagement with an inlet orifice of a mould (not shown). Forward displacement of the valve 17 is limited by an enlargement 20 and rearward movement by engagement of the nozzle head 18a with the fixed cylinder head 15. In the forward position of the valve 17 as shown in FIGURE 1, lateral inlet passages 19 communicating with the valve bore 18 are closed against the bore 16 in the fixed head 15. In the rearward position of said valve 17 as shown in FIGURE 2, the lateral passages 9 are open and material can be displaced from the cylinder through the nozzle valve and thence into the mould.

The arrangement is such that prior to the injection of plastic material into the mould, the rotating screw 2 feeds the material into the forward end of the cylinder through the non-return valve 4 which is opened by the pressure created by the screw. Also the cylinder 1 is displaced forwardly by the pressure of the material as described in Patent No. 2,885,734. Injection of plastic material into the mould is then effected by relative longitudinal displacement of the screw and cylinder with the nozzle valve head 18a in sealed engagement with the mould orifice. The required relative displacement of the screw and the cylinder can be effected either by advancing the screw in the cylinder, or by retracting the cylinder relative to the screw while keeping the mould in pressure engagement with the mould orifice. The aforesaid relative displacement closes the non-return valve 4 and the injection is effected by piston action of the screw 2 and the closed valve 4 in conjunction. The effect of the spring piston rings 14 on the piston valve 4 is to either retard or to prevent rotation of the said valve in the cylinder so that while the screw 2 is rotating there will be relative rotational movement between the respective seating surfaces 3 and 10 of the non-return valve which will prevent or at least greatly reduce the accumulation or trapping of plastic material in the valve. The spring rings 14 also effectively prevent backward leakage of plastic material past the non-return valve during injection. Also the conical or tapered form of the said valve seating surfaces 3 and 10 causes plastic material to be squeezed out radially during closing movement of the valve and thereby assists in securing the desired result. It will also be noted that during the filling of the forward cylinder space by screw action, the plastic material is forced through a narrow annular passage formed by the spaced valve seating surfaces 3 and 10 and thence through the narrow passages 11 in the valve 4 which is either not rotating or is retarded relatively to the rotating screw 2. By this action the plastic material is subjected to a further kneading or plasticising action which prevents deterioration of the material and tends to maintain the valve passage clear of deposits.

The invention is not restricted to the example described above, since the details of construction may be widely varied. Thus, for example, the tapered seating surface 3 associated with the screw 2 may be provided on a separate structure secured to the screw.

I claim:

1. Apparatus for injection moulding comprising a cylinder having an injection nozzle, a feeding screw rotatable within the cylinder, a diffuser structure on the said screw formed to provide a series of narrow passages through which plastic material is forced by the screw, a non-return valve member of piston form associated with said diffuser structure and rotatably and reciprocably mounted on the screw for co-operating with a fixed seat on the screw to displace the valve by pressure thereon during injection, and at least one spring piston ring mounted on the non-return valve member to engage the cylinder bore under a pressure sufficient to retard rotation of said valve member relative to the rotating feeding screw while the valve member is in open position.

2. Apparatus according to claim 1 in which the non-return valve seating surfaces are of annular tapered form and are spaced radially inwardly from the bore of the cylinder.

3. Apparatus according to claim 1, in which the passages of the diffuser structure are formed in the non-return valve member.

4. Apparatus according to claim 1, in which the passages of the diffuser structure are formed in the non-return valve member and have exit ends of outwardly flared shape.

5. Apparatus according to claim 1, in which the passages of the diffuser structure are formed in the non-return valve member, said valve member having a recess at its end adjacent to the feeding screw, said passages extending forwardly from said recess substantially parallel to the cylinder axis, and the exit ends of said passages being of outwardly flared shape.

6. Apparatus according to claim 1, in which the seating surfaces of the non-return valve member are of annular tapered form, and the passages of the diffuser structure are formed in said valve member and are spaced radially inwardly from said seating surfaces.

7. Apparatus according to claim 1, in which the non-return valve member has at least two spring piston rings engaging the bore of the cylinder.

References Cited in the file of this patent

UNITED STATES PATENTS

| 2,885,734 | Wucher | May 12, 1959 |
| 2,903,747 | Wucher | Sept. 15, 1959 |

FOREIGN PATENTS

| 1,168,011 | France | Aug. 25, 1958 |